June 23, 1970 S. F. LEMANSKI 3,516,310
TOOL MOUNT AND ACCESSORY
Filed May 24, 1967 3 Sheets-Sheet 1
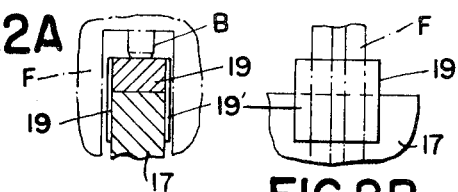
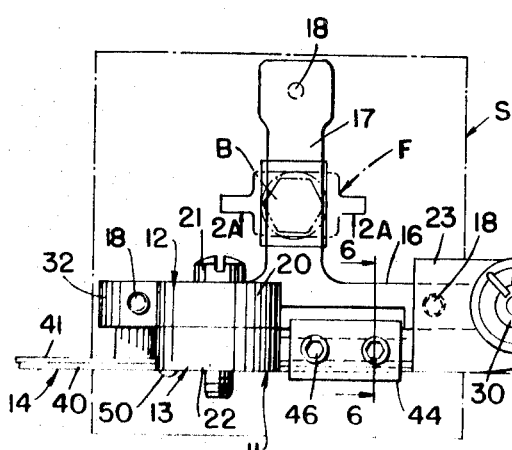
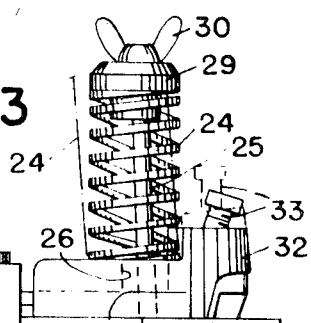
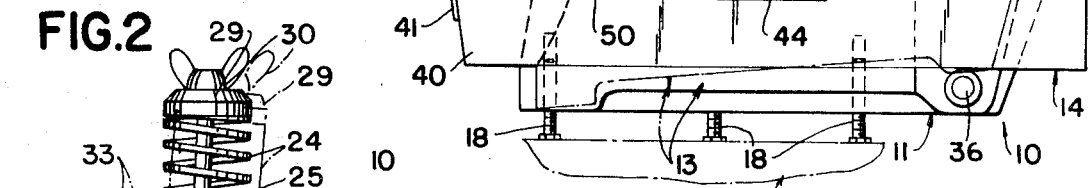
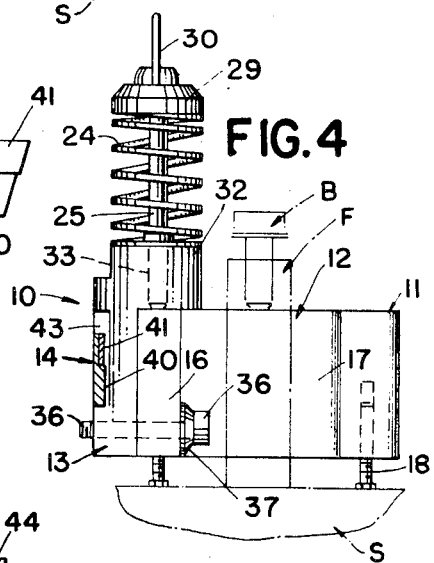
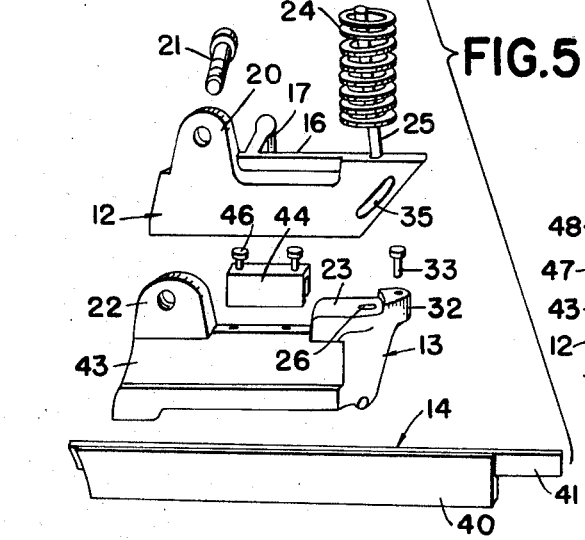
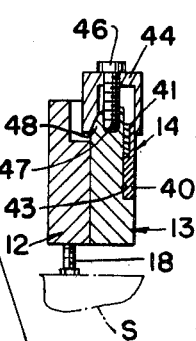
INVENTOR.
SAVARIAN F. LEMANSKI
BY
ATTORNEYS June 23, 1970      S. F. LEMANSKI      3,516,310
TOOL MOUNT AND ACCESSORY
Filed May 24, 1967      3 Sheets-Sheet 2
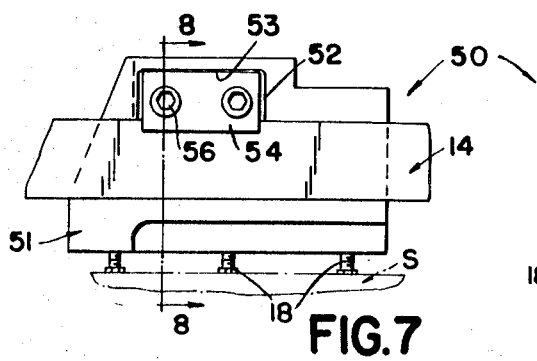
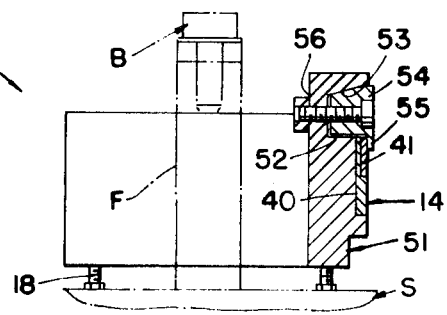
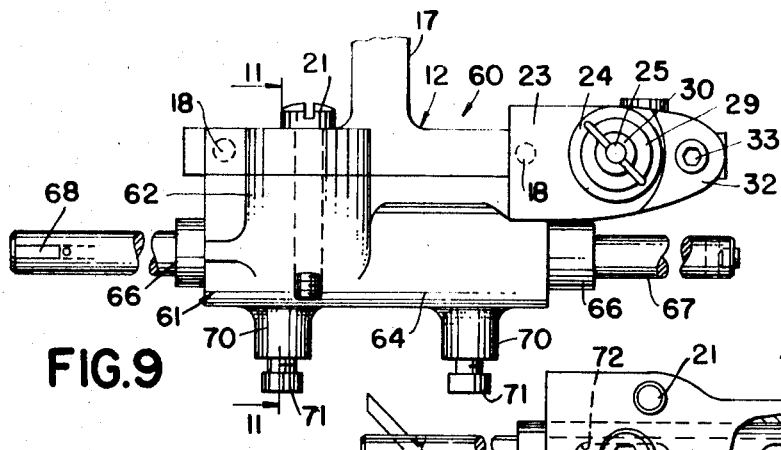
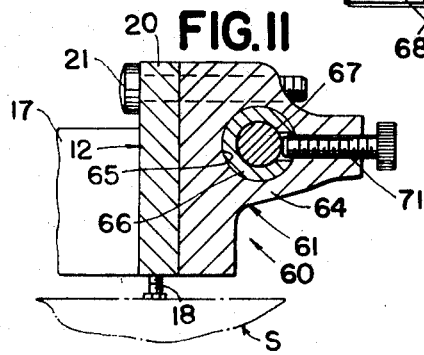
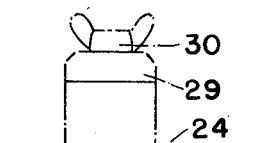
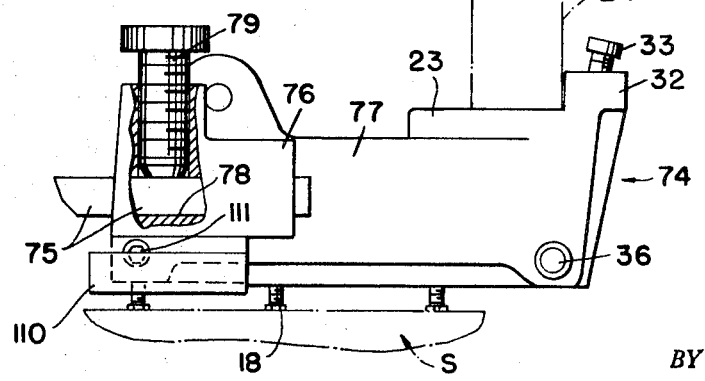
INVENTOR.
SAVARIAN F. LEMANSKI
BY
ATTORNEYS June 23, 1970     S. F. LEMANSKI     3,516,310
TOOL MOUNT AND ACCESSORY
Filed May 24, 1967     3 Sheets-Sheet 3
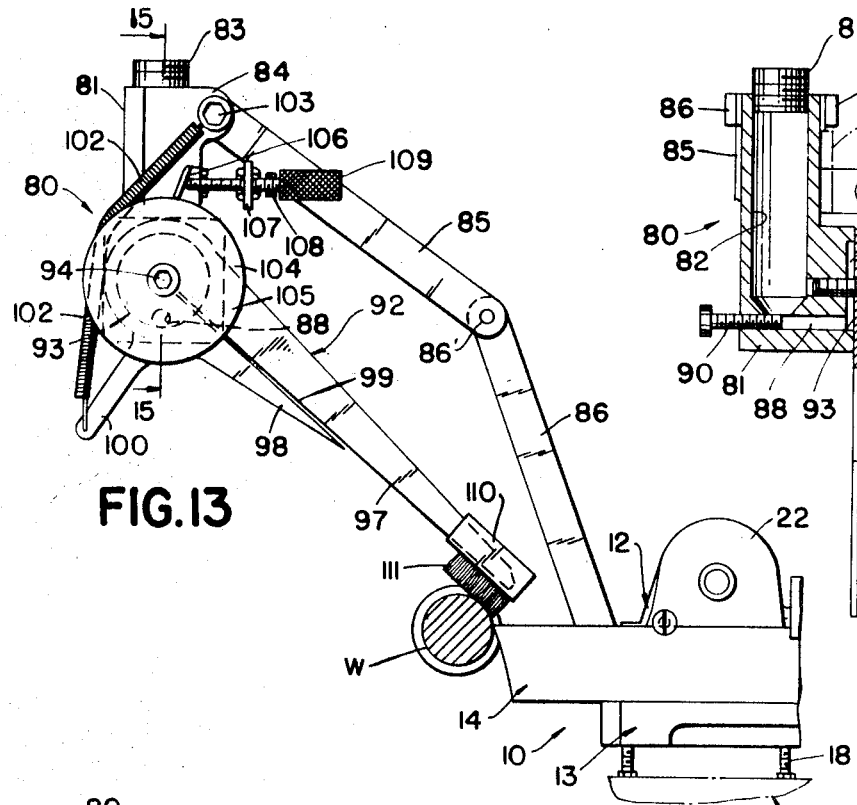
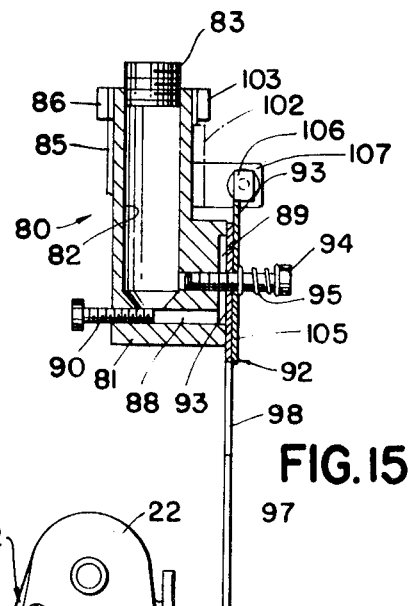
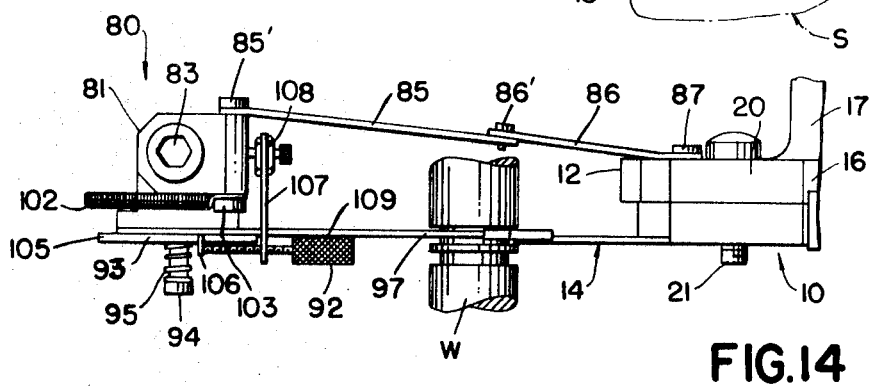
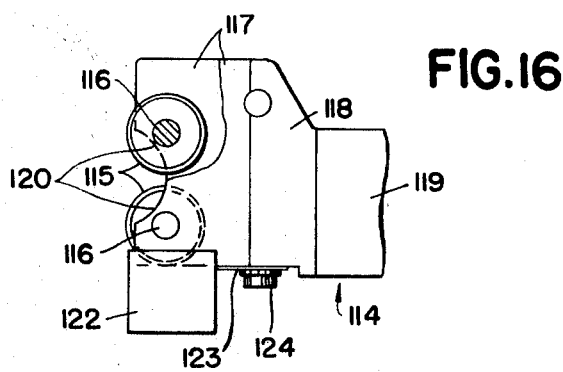
*INVENTOR.*
SAVARIAN F. LEMANSKI
ATTORNEYS United States Patent Office 3,516,310
Patented June 23, 1970

3,516,310
TOOL MOUNT AND ACCESSORY
Savarian F. Lemanski, 109 Taylor Ave.,
Detroit, Mich. 48202
Filed May 24, 1967, Ser. No. 640,921
Int. Cl. B23b 29/00
U.S. Cl. 82—36                                10 Claims

ABSTRACT OF THE DISCLOSURE

An improved mount for metal cutting tools is disclosed, in particular tools for cut-off, grooving, threading, boring and like rotary turning operations. However, the mount may receive a cutter used in non-rotary machine tool work, for example, in planing, shaping, etc.; and knurling is also contemplated.

Provision is made to afford a slight resilient yielding movement of the cutter in the direction of relative rotative or linear advance of the workpiece past the workpiece, under a suddenly increased or shock work load. This may occur in the event of a tendency of the cutter to snag, for example upon an unduly hasty or irregular advance of the cutter toward the workpiece, upon the cutter's encountering a local hard spot in the workpiece, or the like.

An improved labricating unit is also disclosed, by which oil is gravitationally fed along a "duckbill" type blade onto the exact zone of the workpiece at which a cut is being made, as in a lathe or cut-off operation.

CROSS REFERENCE TO RELATED APPLICATION

A typical application of the improved mount of the invention is in association with a cut-off tool such as is described and illustrated in certain figures in my copending application, Ser. No. 519,703, filed Jan. 10, 1966 and now abandoned. This is a special two-piece tool comprised of a pair of flat, hardened steel cutting blades disposed in direct side-by-side contact with one another, with one of the blades advanced more toward the workpiece than the other, in a manner to make an initial attack on the workpiece and thereby relieve the cutting load imposed on the other blade, hence the cut-off load borne by the two-part cutter as a whole.

SUMMARY OF THE INVENTION

The improved tool mount of the invention provides for the relief of instantaneous shock or irregular loads, thus to protect the mounted tool in the yielding manner generally indicated above. The mount comprises a two-part body structure, one part of which is a base part or body bar adapted to be rigidly and fixedly mounted onto the usual carriage cross slide of a lathe (or the corresponding unit of another type of machine tool), by means of conventional existing clamp means on the slide. The other part of the body structure is a secondary part or arm movably mounted upon the fixed body bar or part in a manner to float pivotally relative thereto. The arm fixedly mounts the cutter, and its float is against the relatively strong resilient bias of compression spring means backed by the body part.

In accordance with the invention, the floating part or cutter arm has provision for increasing or diminishing the spring bias under which it is urged against the fixed part. Furthermore, provision is made for an adjustable initial and normal support of the arm by the body member.

Thus the relationship of the floating, cutter-carrying arm to the fixed body is such that the arm will yield, under shock load encountered in operation, to a very slight extent from its normal, adjustably supported position on the body, returning instantaneously under strong spring bias to its original position, once the excess load is relieved.

More particularly, in the improved tool mount the secondary body or floating arm part is pivotally mounted to a side of the body quite closely adjacent the end of the arm from which the cutter projects, and a strong coil compression spring biases the arm toward the fixed body or base at a point quite remote from and at the opposite side of the arm's pivotal connection to the body part.

Thus, a considerable mechanical advantage exists in multiplication of the resilient, arm-holding force of the spring. This multiplied holding force is ordinarily ample to keep the cutter arm in fixed relation to the fixed body part of the mount under normal cutting load; however, the spring will yield in the manner described above under an abnormal sudden shock load to protect the cutting tool against damage.

In two of the herein described embodiments or adaptations of the improved mount, as employed in conjunction with a two-piece cut-off tool pursuant to my application identified above, alternative optional means are incorporated to releasably clamp the cutter or tool to the floating arm or body half of the mount. Either of these alternatives affords a strong clamp of the two blade elements of the cut-off tool to the floating body arm, yet with a very quick and easy release of blade clamping force to facilitate adjustment of the cutter as desired, or to convert it from operation as a cut-off tool to operation as a surface turning or threading tool.

In other embodiments of the improved mount for the mounting of a cutter other than the two-piece cut-off or turning tool mentioned above, the invention contemplates means adapting the mount for the longitudinally adjustable reception, and fixed clamping on the floating body arm, of a boring bar or rod type of tool. Such cutter might also be optionally employed in a lathe, a planing or a shaping operation. Provisions to afford the desired resiliently biased, floating mount of the boring bar, as carried on the secondary body or arm part of the mount, are similar to those described above.

In any of the adaptations of the invention the fixed body or base member of the improved mount is preferably provided with readily adjustable, set screw type legs supporting the same on the slide of the tool carriage when the mount is clamped onto the slide. Hence a desired elevation or inclination of the mount as a whole relative to the tool carriage may be had, or may be very finely adjusted in a rapid manner.

In further accordance with the invention, the floating arm part of the body structure of the mount has adjustable set screw means for making an adjustment of that arm on the fixed body part. This enables any desired initial setting or subsequent adjustment of the inclination of the cutter relative to the pivotal axis of the floating arm which carries the tool. That is, the normal operating position of the cutter on the mount is determined and limit-stopped by the set screw means in question. In addition, the invention contemplates readily manipulable means for rigidly locking the two body members of the mount together, in the event it is desired not to take advantage of the resiliently biased floating arm feature.

In another of its aspects, the invention provides simple and improved means for lubricating the workpiece at the cutting zone of the tool. Such lubricating unit is in the form of a small, refillable oil reservoir carried in fixed relation to the mount of the invention, as by a bracket arm affixed to the mount.

Such lubricating unit comprises an elongated "duckbill" type of lubricating blade rotatably mounted to a side of the oil reservoir for swing in a vertical plane transverse of the axis of a workpiece being turned, threaded or cut off by the tool. The duckbill blade is longitudinally slit and extends at an inclination downwardly to the workpiece, and may rest directly on the latter at the cutting zone, receiving oil from the reservoir through a simple valve arrangement of the latter. Spring means urge the lubricating blade about its pivotal connection to the reservoir, biasing a tip of the blade with slight pressure against the workpiece. If desired, the free end of the duckbill blade may be equipped with a removable brush by which the direct application of oil to the workpiece is made.

Accordingly, a constant, small and regulable supply of lubricating oil gravitates onto the workpiece at the cut turned therein, running down the blade from the reservoir to the zone of the cut. If desired, and as contemplated by the invention, a mechanical connection may be made from the tool mount to the lubricating blade, for the purpose of automatically shifting the latter out of contact with the workpiece when the mount is withdrawn away from the latter.

In certain embodiments the tool holder also has associated therewith a small sheet metal container to receive lubricant dripping from the cutter, knurling rolls or other tool means mounted on the holder.

BRIEF DESCRIPTION OF THE DRAWINGS

FIG. 1 is a top plan view of one embodiment of the improved tool mount of the invention, indicating in dot-dash line the manner in which this mount may be secured on a conventional lathe tool carriage slide also in dot-dash;

FIG. 2 is a view in side elevation of the mount, being partially broken away and vertically sectioned, this view indicating in solid and dot-dash line the manner in which the spring-urged, secondary body member or arm may float to relieve load on the cutter;

FIG. 2A is a view in vertical section on line 2A—2A of FIG. 1, showing a saddle detail;

FIG. 2B is a side elevation of that detail;

FIG. 3 is a view in elevation of the side of the mount opposite that depicted in FIG. 2;

FIG. 4 is an end elevational view of the improved mount, in the direction from the workpiece toward the mount, the cutter being in vertical transverse cross section;

FIG. 5 is an exploded view of the various components of the mount;

FIG. 6 is a view in transverse vertical section, along line 6—6 of FIG. 5, more clearly illustrating provisions for the quick-release clamp-up of a two-piece cutting blade, in accordance with one embodiment;

FIG. 7 is a view in side elevation of a modified embodiment of such cutter clamping means, as utilized on a simplified version of the mount lacking a floating arm;

FIG. 8 is a view in transverse vertical section on line 8—8 of FIG. 7;

FIG. 9 is a fragmentary top plan view of an alternative embodiment of the mount adapted to adjustably receive an elongated rod or bar type of tool, this mount incorporating an auxiliary sliding sleeve receiving the tool bar;

FIG. 10 is a side elevational view of the mount of FIG. 9;

FIG. 11 is a view in transverse vertical section on line 11—11 of FIG. 9;

FIG. 12 is a fragmentary side elevational view showing the mount pursuant to the invention as being modified to receive a thread forming or related type of tool, this view also illustrating a lubricant collecting receptacle on the holder;

FIG. 13 is a fragmentary side elevational view showing the mount of the invention as associated with an improved type of workpiece lubricating unit, also in accordance with the invention;

FIG. 14 is a fragmentary top plan view of the combination of mount and lubricator of FIG. 13;

FIG. 15 is a view in section on line 15—15 of FIG. 13; and

FIG. 16 is a fragmentary side elevational view showing the improved mount as modified to operate in a knurling operation, this alternative, like that of FIG. 12 also incorporating a drainage oil receiving vessel.

DESCRIPTION OF PREFERRED EMBODIMENTS

The embodiment of the improved tool holder illustrated in FIGS. 1–6, inclusive, of the drawings is generally designated by the reference numeral 10, and it generally comprises a tool base structure 11 made up of two basic components, i.e., a primary base or body part of member 12 which is adapted to be fixedly and rigidly mounted upon the tool slide S (indicated in dot-dash line) of a conventional tool carriage of a lathe (or equivalent tool carrier of another type of machine tool); and a secondary or auxiliary, floating body member or arm 13, which carries the cutting tool 14, in a manner to be described.

The body member 12 is of a relatively massive, cast construction, in iron, brass or bronze for adequate strength. As viewed from above (FIG. 1) it is generally in the form of an inverted T, including an elongated bar portion 16, from which a mounting bracket member 17 projects integrally at 90°. The members 16, 17 are substantially equal in vertical depth; and three upright adjustable set screws 18 are threadedly received in tapped openings of body member 12, i.e., adjacent the end of the transverse bracket portion 17 and adjacent opposite ends of the elongated portion 16. These are adapted to engage the tool slide S from above, enabling a precise adjustment of the elevation of mount 10 above the slide, and a fine adjustment of the angularity of the mount relative to the slide.

It is contemplated that the foot-like set screws 18 shall be applied to tapped openings at the bottom of member 12, being provided with hex lower extremities to receive a tool; however, they may be equally well applied and manipulated, in the form of Allen-headed screws, from above the fixed part 12.

For the purpose of stably clamping tool mount 10 onto the slide, the transverse body portion 17 is engageable from above, in the usual manner, by a vertically slotted clamp fitting F (dot-dash line in FIG. 1) and hex-headed bolt B taking into the fitting F and clampingly engaging the transverse body portion 17 from above. This type of connection of a tool holder to a lathe-carriage slide is well known in the art, as well as equivalent tool holder connections of other types of machine tools with which it is contemplated that the improved mount of the invention may be utilized. It is intended that the projecting member, or some equivalent thereof, be rigidly engaged by such connecting means.

By preference, however (reference being had to FIGS. 2A and 2B in conjunction with FIG. 1), the clamped connection is made through the agency of a clamp unit including a bar 19 having plates 19' welded, soldered or otherwise fixed to the sides thereof. This unit saddles over body portion 17 and is engaged from above by bolt B.

Quite closely adjacent one of its ends (left-hand in FIGS. 1, 3 and 5; right-hand in FIG. 2), the body member 12 of mount 10 is cast to provide an upwardly projecting, round boss 20 having a cylindrical cross bore for the reception of a pivot bolt 21, the purpose of which will be described.

The floating body member, part or arm 13 is approximately co-extensive in length with the fixed body member 12, and is disposed in flatwise side engagement with the latter, as appears in FIGS. 1 and 4. Like the fixed body member 12, the floating arm 13 is formed to provide an upwardly projecting boss 22 which, in the assembled condition of the parts, is in side-by-side register with the corresponding boss 20 of fixed body member 12. Boss 22 is threaded to receive the bolt 21, which thus serves as a pivot for the vertical, load receiving swing of arm 13 in the operation of mount 10. A taking up or loosening of bolt 21 may be resorted to to vary the degree of frictional resistance to swing of the floating member or arm 13.

Adjacent the opposite end of floating member 13 (right-hand in FIGS. 1, 3 and 5; left-hand in FIG. 2), the latter has a horizontally laterally projecting flange 23 of substantial area, which directly overhangs the top of the body portion 16 of the mount. This flange 23, as appears in FIGS. 1, 3 and 5, affords a bottom seat for an upwardly projecting coil compression spring 24 of considerable strength, which encircles a threaded stud 25. Stud 25 is received in an opening 26 of substantial size formed through the spring seating flange 23, and is fixedly threaded at its lower end (FIG. 2) in a hole 27 tapped downwardly into the top of the fixed body member or part 12. As appears in FIGS. 2 and 3, the stud 25 inclines slightly forwardly, i.e., to the right in FIG. 2 and the left in FIG. 3.

A centering plug 29 is received in the upper end of coil compression spring 24, centering the latter substantially vertically above the seating flange 23; and a wing nut 30 is threaded upon the upper end of stud 25, compressively engaging spring 24 from above. Thus, the degree of resilient bias exercised by spring 24 upon the flange seat 23 of floating arm 13, to urge the latter counterclockwise (FIG. 2) about its pivotal axis at bolt 21, may be varied by an appropriate adjustment of wing nut 30 to increase or diminish the effective spring force. This force is multiplied by the relatively long moment arm existing between the pivot at 21 and the point at which spring 24 is effective on the cutter carrying, floating arm 13, representing a considerable mechanical advantage effective to hold the tool 13 in cutting engagement with a workpiece. When a sudden resistance to effective material removal is encountered, the arm 13 will yield (clockwise in FIG. 2; counterclockwise in FIG. 3), as illustrated in solid and dot-dash lines, against the holding force of spring 24, thus protecting the tool.

Provision is made to provide for an initial setting, or subsequent adjustment, of the inclination of floating arm 13 (hence of the tool or cutter 14 carried thereby) relative to fixed body member 12, and the tool carriage slide S and workpiece.

To this end the spring seating flange 23 of arm 13 is formed to provide an upwardly projecting boss 32 at its end remote from pivot bolt 21, just outwardly of the seating surface of flange 23; and boss 32 is drilled and tapped to receive a set screw 33. The screw 33 extends through the tapped opening, to engage the top of fixed body member 12 from above, thus constituting a limit stop for the normal operating position of floating arm 13, to which the latter is urged strongly by spring 24, and to which position that arm returns when the excess load on cutter 14 is ended or abated.

Should it be desired to operate the improved mount 10 as an entirely rigid one, without benefit of the load receiving, floating action referred to, the fixed body part 12 is provided, directly beneath the spring seating flange 23 of the floating arm 13, with an arcuate through-slot 35; and a headed set screw 36 extends through this slot, with a split compression spring 37 interposed, into threaded engagement with a tapped hole in the floating arm 13. Thus, screw 36 may be taken up tightly against the resistance of spring 37 to draw together and clamp the body parts 12 and 13, as a rigid unit, in any desired angular relation of those parts to one another as determined by the adjustment of the stop screw 33. Again, the positioning of this optional connection remote from the pivotal connection of parts 12 and 13 at both 21 has an influence on the rigidity of their connection to one another, when called for.

The cut-off tool 14 associated with the tool mount 10 comprises a first blade 40 of given thickness or horizontal width and a second blade 41 of lesser thickness (approximately one-half) and substantially less vertical dimension. Blade 40 is longitudinally recessed at its top and throughout the length thereof to receive blade 41 in snug side-by-side engagement. As appears in FIGS. 4 and 6, the blade 41 has a slightly tapered cross section for improved cutting clearance, since it projects a trifle forwardly of blade 40 when used as a cut-off, as illustrated in FIGS. 1, 2 and 3. This is in the manner illustrated and further described in my copending application identified above. However, tool 14 may also be employed as an ordinary surface turning or thread-forming cutter, with the blades 40 and 41 disposed flush with one another at their corresponding ends.

In accordance with the embodiment 10 of the invention illustrated in FIGS. 1 through 6, the blade 14 is clamped in place in an elongated upright side recess 43 of the floating body member or arm 13 of the tool, by means of a small rectangular saddle 44 best shown in FIG. 6. This saddle is of inverted U or channel-shaped cross section throughout its length, being provided at its top with a pair of longitudinally spaced holes for the reception of locking screws 46, which are received from above in tapped openings 47 of floating arm 13. The right-hand leg (FIG. 6) of clamp saddle 47 is positioned to slide downwardly over the side of the two-blade cutter 14, while the other leg of clamp 44 is inclined or tapered at 48 to wedgingly engage from above a correspondingly tapered upper edge of the arm 13. The clamping action is supplemented by a screw 50 threaded into boss 22.

Thus, screws 46, 50 may be easily and quickly taken up to clamp cutter 14 in any adjusted longitudinal position on floating arm 13, and just as easily backed off to release cutter 14 for adjustment, or to convert it from a cut-off tool to a surface turning or threading tool.

FIG. 5 of the drawings shows all of the component elements of tool 10 in an exploded condition, and will be of assistance to a clear understanding of those elements, as shown in assembled condition in FIGS. 1-4 and 6.

FIGS. 7 and 8 show a somewhat modified form of mount, generally designated 50, in accordance with the invention, as altered in particular with reference to the tool clamping provisions. As it happens, the mount 50 is a simplified, low cost version of the mount 10, in that the floating arm load-receiving features of the latter have been omitted. However, it is to be understood that the tool clamp structure of FIGS. 7 and 8 may also be incorporated in the more refined, two-part mount structure of FIGS. 1-6.

In this alternative adaptation, the body member of mount 50, specially designated 51, is a fixedly clamped one, being provided, just above the side recess thereof which directly receives tool 14, with a deeper side recess 52 having a mildly inclined upper bearing surface at 53. Recess 52 receives a wedge-action clamping block 54 from the side thereof, which block has a bottom extension or blade holding lip 55 downwardly overlapping the outer side of tool 14. A pair of clamping screws 56 extend through generous size bores in block 54, being threaded into a built-up portion of arm 51 behind the latter's recess 52. Accordingly, a taking up of screws 56 wedges block 54 into recess 52 and brings its lip extension 55 downwardly and laterally against tool 41, clamping the latter rigidly in place on floating arm 51. A very quick lock-up and release of the tool 14 for adjustment are possible.

FIGS. 9, 10 and 11 illustrate an alternative embodiment or adaptation, generally designated by the reference numeral 60, of the mount of the invention, for the reception of a different type of cutter, specifically shown as a boring bar type. Here, the floating body or arm member, specially designated by the reference numeral 61, is formed to provide, in addition to an enlarged upper boss 62 (FIG. 9), in which the pivot bolt 21 is threadedly received, a horizontal and elongated further boss 64 having a longitudinal through bore 65 formed therein, as shown in FIG. 11. Bore 65 slidably receives an elongated sleeve 66 of somewhat greater length than its own, the sleeve projecting from opposite ends of boss 64 (FIGS. 9 and 10). Sleeve 66 in turn slidably receives an elongated boring bar or rod 67 which has provision at its outer end to removably receive a suitable hardened cutter bit 68.

Means are provided to enable the rigid and releasable clamping of the boring bar 67 in a wide range of adjusted positions on floating arm 61. To this end, the latter has a pair of longitudinally spaced and laterally projecting side enlargements 70 formed on its boss 64, which boss enlargements are drilled and tapped to receiving locking set screws 71. The sleeve 66 is provided with a pair of aligned and elongated slots 72 at one side thereof, through which slots the respective screws 71 extend for releasable clamping engagement with boring bar 67, in the manner shown in FIG. 11.

Accordingly, with the auxiliary sleeve 66 in any given longitudinal position in the boss bore 65, the adjustment of cutter tool 68 may be altered by simply loosening lock schews 71 and sliding bar 67 longitudinally in the sleeve. Should the range of adjustment require further extension, the sleeve 66 may be slid forwardly or rearwardly in bore 65, and the boring bar again adjusted as desired therein, then clamped rigidly by screws 71. Thus the elongated slots 72 permit a desired wide range of adjustment of the boring bar 67 for deep recessing.

It is evident that amount of the sort designated 60 may also be employed in an external surfacing operation, in the manner of a lathe tool mount. Likewise, it is evident that the arrangement may be optionally employed in other machining operations, for example, shaping, planing and the like.

In reference to the remaining components of the embodiment 60, they correspond with those illustrated and described in FIGS. 1 through 6, hence are designed by corresponding reference numerals, and further description in detail is dispensed with.

A still further modified form of the invention, illustrated in FIG. 12 and generally designated by the reference numeral 74, represents a modification of the basic structure to mount a thread forming, cutting or like lathe-type tool 75 which is of square cross section. To this end, an integral enlarged side boss 76 is formed on the floating arm component, designated 77, of the holder, and the boss has a square section bore 78 therethrough which slidably receives the tool 75. A large clamp screw 79 is threaded downwardly into the boss 76 to engage and clamp tool 75 in a desired, longitudinally adjusted position. Other components of the holder are as shown in earlier views. FIG. 12 shows the holder member 74 as being equipped with a small four-walled sheet metal receptacle 110 of elongated rectangular shape, which receptacle is removably secured by a screw 111 to the side of member 77 directly beneath the boss 76 of the latter. Receptacle 110 receives drainage drippings from tool 75 when the latter operates on a workpiece which is lubricated at the cutting zone, as by a unit such as that now to be described; and the receptacle may be periodically dumped of its accumulation of oil.

FIGS. 13 and 14 depict a combination of the mount of the invention, illustratively represented as the version 10 of FIGS. 1 through 6, as embodied in combination with an improved and highly simple lubricating unit, generally designated by the reference numeral 80. This unit comprises an upright reservoir member 81 having a vertical cylindrical chamber 82 to receive a quantity of a suitable grade of lubricating oil, the reservoir chamber 82 being closed liquid-tight at its top by a threaded plug 83. An integral side boss 84 (FIG. 13) is provided on reservoir 81; and an elongated, upwardly inclined rigid strap or bar 85 is fixedly secured at its top by a screw 85' to the boss 84. Strap 85 is rigidly secured at its bottom to another bar 86, as by a screw at 86' permitting a pivotal adjustment an dreclamping of bars 85, 86 relative to one another; and the bottom of bar 86 is fixedly but adjustably clamped by a screw 87 to a side of the fixedly mounted base part 12 of the mount 10, so that the latter supports the lubricating unit 80 above and on the opposite side of a workpiece W from the mount 10. The angularity of straps or bars 85, 86 may be adjusted as desired to vary the position of oil reservoir 81; and the latter will be supported rigidly in any such position relative to the workpiece.

Referring to FIG. 15, the reservoir's oil chamber 82 discharges gravitationally into a small passage 88 adjacent the bottom of the reservoir body, which passage opens outwardly into a circular side recess 89 in the body. The rate of discharge of oil from chamber 82 may be regulated or cut off entirely by an adjustable screw 90 threaded into the passage 88 from the opposite side of the reservoir's body.

The reference numeral 92 designated an elongated, "duckbill" type of oil dispensing blade which is associated with reservoir 81 as part of the lubricating unit 80. This blade, which is of a relatively thin but rigid gauge of steel, has a semi-circular upper extremity 93 which engages sidewise and flatwise over the side recess 89 of the reservoir, covering a major part of the recess into which oil gravitationally flows from passage 88; and a headed set screw 94 is threaded into the reservoir body centrally of recess 89, with a coil compression spring 95 interposed between lubricator blade 92 and the screw head, as best illustrated in FIG. 15. Thus, the duckbill blade 92 is firmly seated laterally against the reservoir to contain oil within the latter's side recess 89, save as it escapes in a limited zone for a flow down blade 92 onto the workpiece W. Blade 92 may pivot about the axis of holding screw 94, the spring 95 exerting sufficient force to keep this pivotal movement a restrained and controlled one.

As shown in FIG. 13, the blade 92 comprises a more elongated upper plate portion 97, which bears downwardly at an acute angle in tangency with the rotating workpiece W, or with the cut formed therein as turning proceeds. There is a second blade portion 98 of substantially less length than the portion 97, and spaced from the latter by a narrow elongated slot 99 (FIG. 13), the two blade portions 97 and 98 being in a common plane, as appears in FIGS. 14 and 15.

An approximately radial extension arm 100 projects integral from the shorter blade portion 98. This arm constitutes a lever arm to which is secured one end of an elongated coil tension spring 102, the opposite end of the spring being anchored to the top boss 84 of reservoir 81, as by a screw 103. However, the screw 86 which clamps the top of the strap 85 may also have the dual function of anchoring spring 102, using a holding nut threaded onto the screw.

As shown in FIG. 13, the spring 102 warps about the upper side of the part of the reservoir 81, adjacent an enlarged rectangular boss part 104 of the latter, in which the latter's side recess 89 is formed, with the result that the spring draws the blade extension arm 100 upwardly, thus biasing duckbill blade 92 clockwise about its pivotal axis at screw 94. Accordingly, the upper and longer blade portion 97 is urged with appreciable force against the workpiece.

In action, the lubricating oil entering the horizontal discharge passage 88 of reservoir 81 (under the flow adjusting or shut-off control of the valving screw 90) will at least partially fill the side recess 89 of the reservoir, then flow outwardly and downwardly along the slot 99 which separates the blade portions 97, 98. Adhering by capillarity to the lower edge of upper blade portion 97, the oil is ultimately deposited in a continuous manner upon the periphery of the workpiece in transverse alignment with the cutter 14, or at the root of the cut being formed by the latter.

Provision is made to adjust the bias of spring 102, and the force under which the duckbill engages the workpiece. For this purpose a flat, circular disc 105 is applied in fixed relation to an outer side of blade 92; and disc 105 has an integral, radially outwardly projecting lug 106 thereon. Further, a transversely extending plate 107 is fixedly secured to the body of reservoir 81, as by screw and nut means 108 (FIG. 14); and a knurl-headed screw 108 is threaded through a tapped opening in plate 107, the end of screw 109 bearing against the lug 106, as shown in FIGS. 13 and 14. Accordingly, a manipulation of screw 109 enables the angular position of duckbill blade 92 about the axis of the picoting set screw 94 to be adjusted as desired.

Although the portion 97 of the duckbill blade may bear downwardly directly in the cut being turned in workpiece W, the invention also contemplates the use of a removable sheet metal brush member 110, which is simply slipped onto the free end of blade member 97. Bristles 111 are inwardly exposed to a slot in blade member 97, so that the application of lubricant to the workpiece is a distributed one.

The lubricating unit 80 is exceedingly simple and inexpensive of construction. It is readily refillable at infrequent intervals, and efficiently affords a controlled flow of the oil to the exact zone alone at which it is needed. It is much more effective than more complicated, remote-supplied lubrication units and, in addition, avoids the splashing and mess usually characteristic of those arrangements.

FIG. 16 of the drawings illustrates a further alternative embodiment, generally designated 114, of the tool mount or holder to present a non-cutting type of tool means. For example, a pair of knurling rolls 115 are rotatively journaled on short shafts 116 between parallel walls 117 of a forwardly bifurcated and vertically elongated boss 118 on the body member 119 of tool 114. The remainder of the latter presents features comparable to those discussed above, in regard to the floating association of the component parts of the holder. Of course, the wall furcations 117 are rearwardly relieved at 120 at the bite of knurling rollers 115 to accommodate the circumference of a workpiece. Tool 114 is shown as being equipped with a small oil receptacle 122 of rectangular cross-section, which receptacle has a flat ear 123 projecting rearwardly from one of the four walls thereof. Screw 124 removably mounts receptacle 122 beneath boss 118 and knurling rolls 115; and the receptacle may, like the corresponding receptacle 110 of the embodiment illustrated in FIG. 12, be periodically dumped.

It is to be seen that the invention affords various embodiments of tool mount, all capable of use in association with the lubricating unit 80 of the sort just described. Under the principle of the invention, the mount is extremely versatile as to its applications in various types of machining. It is simple and inexpensive of production as to its parts, as well as the assembly thereof; and, in most of the embodiments herein shown and described, a novel and effective kind of protection is automatically afforded the tool against possible damaging shock or excessive work load.

What I claim as my invention is:

1. A tool mount having a body structure comprised of a fixed body base member adapted to be fixedly connected to a machine tool support, and a body arm member having means to mount a tool to engage a workpiece and means to support the arm member for movement relative to the fixed base member under an excessive work load on the tool, and means biasing said arm member in resistance to said relative movement, said biasing means comprising a coil compression spring acting at one end on said arm member, said base member having an elongated stud anchored thereto at its lower end and projecting thereabove, said stud being encircled by said spring and having a member adjustable on its upper end to engage and variably compress said spring.

2. A tool mount having a body structure comprised of a fixed body base member adapted to be fixedly connected to a machine tool support, and a body arm member having means to mount a tool to engage a workpiece and means to support the arm member for movement on a pivotal axis relative to the fixed base member under an excessive work load on the tool, and spring means biasing said arm member in resistance to said relative movement, said arm member being provided adjacent the side thereof remote from the base member with means for the mounting of the tool for adjustment transversely of the pivotal axis of the arm member, including a laterally opening side recess on the arm member, and a releasable clamp having means threadedly engaging the top of said arm member and engaging downwardly on said tool to clamp the latter, said arm member receiving adjustable stop means engageable with said base member to limit the swing of said arm member toward the base member under the bias of said spring means, said base member having adjustable stop means projecting therebeneath for sustaining engagement with a fixed support.

3. A tool mount having a body structure comprised of a fixed body base member adapted to be fixedly connected to a machine tool support, and a body arm member having means to mount a tool to engage a workpiece and means to support the arm member for movement on a pivotal axis relative to the fixed base member under an excessive work load on the tool, and spring means biasing said arm member in resistance to said relative movement, said arm member being provided adjacent the side thereof remote from the base member with means for the mounting of the tool for adjustment transversely of the pivotal axis of the arm member, including a laterally opening side recess on the arm member, and a releasable clamp having means threadedly engaging the top of said arm member and engaging downwardly on said tool to clamp the latter, said body and arm members being in side-by-side relation to one another, said supporting means pivotally connecting the arm member to the base member to swing on an axis transverse of the members and in the direction in which the workpiece travels relative to the tool, said arm member having a portion laterally overlapping the base member, said spring means acting against said portion to bias the arm member toward said base member and thus oppose said swing of the arm member, said laterally overlapping portion of said arm member receiving adjustable stop means engageable with said base member to limit the swing of said arm member toward the base member under the bias of said spring means, said base member having adjustable stop means projecting therebeneath for sustaining engagement with a fixed support.

4. A tool mount having a body structure comprised of a fixed body base member adapted to be fixedly connected to a machine tool support, and a body arm member having means to mount a tool to engage a workpiece and means to support the arm member for movement on a pivotal axis relative to the fixed base member under an excessive work load on the tool, and spring means biasing said arm member in resistance to said relative movement, said arm member being provided adjacent the side thereof remote from the base member with means for the mounting of the tool for adjustment transversely of the pivotal axis of the arm member, including a laterally opening side recess on the arm member, and a releasable clamp having means threadedly engaging the top of said arm member and engaging downwardly on said tool to clamp the latter, said spring means being a coil compression spring acting at one end on said arm member, and further comprising an upright stud anchored at its lower end on said base member, said stud being encircled by said spring and having means at its opposite end to engage and adjust the degree of compression of the spring.

5. A tool mount having a body structure comprised of a fixed body base member adapted to be fixedly connected to a machine tool support, and a body arm member having means to mount a tool to engage a workpiece and means to support the arm member for movement on a pivotal axis relative to the fixed base member under an excessive work load on the tool, and spring means biasing said arm member in resistance to said relative movement, said arm member being provided adjacent the side thereof remote from the base member with means for the mounting of the tool for adjustment transversely of the pivotal axis of the arm member, including a laterally opening side recess on the arm member, and a releasable clamp having means threadedly engaging the top of said arm member and engaging downwardly on said tool to clamp the latter, said body and arm members being in side-by-side relation to one another, said supporting means pivotally connecting the arm member to the base member to swing on an axis transverse of the members and in the direction in which the workpiece travels relative to the tool, said arm member having a portion laterally overlapping the base member, said spring means acting against said portion to bias the arm member toward said base member, said spring means being a coil compression spring acting at one end on said overlapping portion of said arm member, and further comprising an upright stud anchored at its lower end on said base member, said stud being encircled by said spring and having means at its opposite end to engage and adjust the degree of compression of the spring.

6. The mount of claim 1, in which said body arm member has a bore of non-circular cross-section to removably receive a tool of like section, and means on said arm member clamping said tool in said bore.

7. The mount of claim 1, in which said body arm member has a bore of non-circular cross-section to removably receive a tool of like section, and means on said arm member clamping said tool in said bore, said arm member having a receptacle thereon beneath said tool to receive lubricant dripping from the latter.

8. The mount of claim 1, in which said tool is a rotary one, said arm member having means rotatively journaling said tool thereon.

9. The mount of claim 1, in which said tool is a rotary one, said arm member having means rotatively journaling said tool thereon, and a receptacle carried by said arm member beneath said tool to receive lubricant draining from the latter.

10. The mount of claim 1, in which said base member has adjustable stop means projecting therebeneath for sustaining engagement with a fixed support.

References Cited

UNITED STATES PATENTS

| | | | |
|---|---|---|---|
| 1,119,669 | 12/1914 | Wigness | 82—34 |
| 1,212,271 | 1/1917 | Smith | 29—97.5 |
| 1,407,764 | 2/1922 | Osberg | 29—97.5 |
| 1,736,449 | 11/1929 | Lipp | 29—97.5 |
| 2,150,959 | 3/1939 | Bergstrom | 82—36 XR |
| 2,391,142 | 12/1945 | Drake | 29—97.5 |
| 2,645,953 | 7/1953 | Schlitters | 29—90 XR |

LEONIDAS VLACHOS, Primary Examiner

U.S. Cl. X.R.

29—96, 97.5; 72—703; 82—34, 37